United States Patent
Prust et al.

(10) Patent No.: US 9,925,631 B2
(45) Date of Patent: Mar. 27, 2018

(54) MACHINE TOOL HAVING A MACHINE MAGAZINE AND A BACKGROUND MAGAZINE

(71) Applicant: CHIRON-WERKE GmbH & Co. KG, Tuttlingen (DE)

(72) Inventors: Dirk Prust, Tuttlingen (DE); Claus Eppler, Messkirch (DE)

(73) Assignee: CHIRON-WERKE GmbH & Co. KG, Tuttlingen (DE)

( * ) Notice: Subject to any disclaimer, the term of this patent is extended or adjusted under 35 U.S.C. 154(b) by 796 days.

(21) Appl. No.: 14/196,262

(22) Filed: Mar. 4, 2014

(65) Prior Publication Data

US 2014/0200126 A1  Jul. 17, 2014

Related U.S. Application Data (63) Continuation of application No. PCT/EP2012/065666, filed on Aug. 10, 2012.

(30) Foreign Application Priority Data

Sep. 9, 2011 (DE) .......................... 10 2011 113 311

(51) Int. Cl.
B23Q 3/157 (2006.01)
B23Q 3/155 (2006.01)

(52) U.S. Cl.
CPC ..... *B23Q 3/15706* (2013.01); *B23Q 3/15526* (2013.01); *B23Q 3/15539* (2016.11);
(Continued)

(58) Field of Classification Search
CPC ............ B23Q 3/15506; B23Q 3/15539; B23Q 3/15706; B23Q 3/15724; Y10T 483/175;
(Continued)

(56) References Cited

U.S. PATENT DOCUMENTS 4,087,901 A * 5/1978 Lohneis ............. B23Q 3/15526
483/41
4,547,955 A * 10/1985 Shiomi ............. B23Q 3/15526
29/33 P
(Continued)

FOREIGN PATENT DOCUMENTS

DE 7229933 U 8/1974
DE 8707780 8/1987
(Continued)

OTHER PUBLICATIONS

EPO Machine Translation of DE 10225143 A1—Winkler et al., "Machining center, comprising first magazine connected to tool exchange unit and additional magazine for wider choice of tools," Jan. 15, 2004.*
(Continued)

Primary Examiner — Erica E Cadugan
Assistant Examiner — Michael Vitale
(74) Attorney, Agent, or Firm — Jason H. Vick; Sheridan Ross, PC (57) ABSTRACT

In a machine tool having at least one tool spindle which is displaceable in relation to a device for holding workpieces in at least one of three spatial directions and in which the tools (W1-W7) for processing the workpieces can be chucked, there are provided a machine magazine (36) in which tools (W1-W7) provided for exchange in the tool spindle (23) are kept in store and a background magazine (31) in which tools (W1-W7) provided for exchange in the machine magazine (36) are kept in store. In the machine magazine (36), not more than four storage places (42, 43, 44, 45) for accommodating tools (W1-W7) are provided (FIG. 2).

4 Claims, 9 Drawing Sheets

(52) U.S. Cl.
CPC ......... *B23Q 3/15724* (2016.11); *Y10T 483/10* (2015.01); *Y10T 483/179* (2015.01); *Y10T 483/1733* (2015.01); *Y10T 483/1855* (2015.01); *Y10T 483/1891* (2015.01)

(58) Field of Classification Search
CPC ........... Y10T 483/179; Y10T 483/1793; Y10T 483/1795; Y10T 483/1845; Y10T 483/1855; Y10T 483/1891
USPC ...................... 483/37, 54, 55, 56, 63, 64, 68
See application file for complete search history.

(56) References Cited

U.S. PATENT DOCUMENTS

| | | | |
|---|---|---|---|
| 4,920,632 A * | 5/1990 | Babel | B23Q 3/15526 211/1.56 |
| 5,383,832 A | 1/1995 | Blazek et al. | |
| 5,885,200 A * | 3/1999 | Sugihara | B23Q 3/155 483/40 |
| 2005/0159280 A1* | 7/2005 | Prust | B23Q 3/15526 483/56 |
| 2005/0239620 A1 | 10/2005 | Lutz et al. | |
| 2006/0079384 A1* | 4/2006 | Yoshida | B23Q 3/15713 483/7 |
| 2007/0184954 A1 | 8/2007 | Muser | |
| 2007/0293379 A1 | 12/2007 | Feinauer et al. | |
| 2010/0004107 A1* | 1/2010 | Amaya | B23Q 3/1552 483/44 |
| 2010/0145498 A1* | 6/2010 | Uchikawa | B23Q 17/22 700/179 |

FOREIGN PATENT DOCUMENTS

| | | | |
|---|---|---|---|
| DE | 4311469 | 3/1994 | |
| DE | 19724635 | 12/1998 | |
| DE | 19851264 | 5/2000 | |
| DE | 19919446 | 11/2000 | |
| DE | 10020801 | 11/2001 | |
| DE | 10163294 | 7/2003 | |
| DE | 10225143 | 1/2004 | |
| DE | 10344642 A1 | 5/2005 | |
| DE | 102004031066 A1 | 9/2005 | |
| DE | 102006028970 | 12/2007 | |
| DE | 202005021767 U1 | 1/2010 | |
| EP | 2295199 A1 * | 3/2011 | ............ B23Q 1/012 |
| JP | 54-099280 | 8/1979 | |
| JP | 62199333 A * | 9/1987 | |
| JP | 63191536 A * | 8/1988 | |
| WO | WO 00/27583 | 5/2000 | |
| WO | WO 2006/050551 | 5/2006 | |

OTHER PUBLICATIONS

International Search Report for corresponding International Application No. PCT/EP2012/065666 dated Mar. 13, 2013.
Written Opinion for corresponding International Application No. PCT/EP2012/065666 dated Mar. 13, 2013.
International Preliminary Report on Patentability for corresponding International Application No. PCT/EP2012/065666 dated Mar. 20, 2014.
German Examination Report for corresponding German Application No. 10 2011 122 922.5, dated Oct. 17, 2016.
European Search Report for corresponding European Application No. 16185179.5, dated Jan. 5, 2017.

\* cited by examiner

MACHINE TOOL HAVING A MACHINE MAGAZINE AND A BACKGROUND MAGAZINE

CROSS-REFERENCE TO RELATED APPLICATIONS

This is a continuation application of co-pending international patent application PCT/EP2012/065666, filed Aug. 10, 2012 and designating the United States, which was published in German as WO 2013/034388 A2, and claims priority to German patent application DE 10 2011 113 311.2, filed Sep. 9, 2011. These priority applications are incorporated herein by reference.

BACKGROUND OF THE INVENTION

The present invention relates to a machine tool having at least one tool spindle which is displaceable in at least one of three spatial directions in relation to a device for holding workpieces, and in which tool spindle tools for processing the workpieces can be chucked, having a machine magazine in which tools provided for exchange into the at least one tool spindle are kept in store, and having a background magazine in which tools provided for exchange into the machine magazine are kept in store.

The invention further relates to a method for a tool change on a machine tool having at least one tool spindle which is displaceable in at least one of three spatial directions in relation to a device for holding workpieces, and in which tool spindle tools for processing the workpieces can be chucked, having a machine magazine in which tools provided for exchange into the at least one tool spindle are kept in store, and having a background magazine in which tools provided for exchange into the machine magazine are kept in store, in which method the at least one tool spindle is moved into a tool-change position in which tools are exchanged between the machine magazine and the at least one tool spindle, wherein a tool-interchange position is provided at which tools are exchanged between the background magazine and the machine magazine.

A machine tool of this type and a method of the aforementioned type are disclosed in DE 102 25 143 A1.

In the context of the present invention, "a tool spindle which is displaceable in at least one of three spatial directions in relation to a device for holding workpieces" is understood to mean an arrangement in which the tool spindle and the workpiece are displaceable in relation to one another in at least one of the three orthogonal spatial axes x, y and z. When the machine tool is what is referred to as a travelling-column machine, all three directions of movement are implemented in the tool spindle, the latter thus being advanced to the workpiece in the x, y and z directions.

However, it is also possible here to implement one or two directions of movement, i.e. in particular the x and y directions, in the workpiece.

It is, however, irrelevant for the implementation of the present invention how the axes of movement are distributed between the tool spindle and the workpiece.

If all three directions of movement are implemented in the tool spindle, the machine tool is preferably a travelling-column machine having a vertical-axis tool spindle; the tool spindle is thus advanced to the workpiece in the vertical direction. However, it is also possible for the tool spindle to be aligned horizontally, such that advancing takes place horizontally.

It is furthermore possible for further pivot axes or rotation axes to be arranged either in the tool spindle and/or in the workpiece.

Without departing from the scope and the advantages and functionalities of the present invention, the machine tool here may be equipped with one, two, four or even more tool spindles. The plurality of tool spindles are preferably synchronously displaced in relation to one another, they are preferably rigidly coupled to one another and in this event serve for the simultaneous and contour-identical processing of as many workpieces as there are tool spindles.

The present invention starts from a machine tool in which both a machine magazine and a background magazine are provided.

A multiplicity of machine tools having tool magazines are known from the prior art. It is customary for the tool magazine to be attached to the machine tool; it may be configured, for example, as a chain magazine or a disc magazine.

In machine tools of this type, a variety of tools which are successively inserted into the tool spindle are kept ready in order to perform specific processing operations on a workpiece. The tool change between the tool magazine and the tool spindle takes place in this case by a variety of ways and means.

For example, DE 197 24 635 A1 discloses a machine tool having a background magazine in the form of a disc magazine in which a double gripper which conveys tools back and forth between the disc magazine and the working space of the machine tool is provided. The double gripper in this case removes a tool from the disc magazine and is then pivoted together with that tool into the working space. There, by way of the pick-up method, the tool spindle approaches the double gripper, deposits the tool that is currently chucked in the tool spindle into the free gripper of the double gripper and then grips the tool that was previously inserted into the double gripper from the disc magazine.

In addition to the disc magazine, the known machine tool also has a machine magazine which is located on the machine tool and from which tools can be likewise changed into the tool spindle. The tool which has been exchanged from the disc magazine into the tool spindle by means of the double gripper can also be deposited into the machine magazine in this manner with the aid of the tool spindle.

A further machine tool, in which the machine magazine is configured as a chain magazine, is disclosed in DE 190 19 446 A1. To change tools, the chain magazine is pivoted into the working space of the machine tool where a tool change to the tool spindle takes place by way of the pick-up method.

In the machine tools described so far, only a specific number of tools can be stored intermediately in the respective machine magazine, such that it is often necessary for the workpiece to be re-chucked on another machine tool in order to be able to carry out processing operations with further tools here.

In this context, DE 197 24 635 A1 describes a machine tool in which an external tool magazine is provided as a background magazine by way of which further tools are provided.

A similar design is also shown in DE 100 20 801 A1. The background magazine is designed as a rack magazine in which a very large number of tools can be stored intermediately. A transfer device which removes tools from the rack magazine and conveys them to a transfer position which is stationary in relation to the rack magazine is provided on the rack magazine.

This transfer position is also served by a double gripper which is pivotably mounted on the machine frame and which, in the transfer position, can deliver a tool to the transfer device or remove a new tool from the transfer device. Having this new tool, the double gripper then pivots close to the working space of the machine tool where it provides the new tool for a tool change by way of the pick-up method.

Once the tool spindle has terminated a processing operation, it travels to the spindle position of the double gripper and initially deposits the tool which has been employed so far into the free gripper. Thereafter, the tool spindle grips the tool which has been newly brought from the rack magazine and again travels to the working space, where processing of the workpiece continues using the new tool.

In theory, any number of available tools are possible with this design, such that the problem of a limited number of available tools that exists for reasons of space in machine magazines is solved by the background magazine together with the transfer device and the double gripper.

The known construction is, however, complex in its design, the tool change not being sufficiently rapid for many applications.

Proceeding therefrom, DE 102 25 143 A1 discloses a machine tool which combines the principle of the machine magazine which, although having a limited number of stored tools, has the potential for rapid tool changes, with the advantages of the background magazine in which the storage potential for any number of tools can be utilized.

The known machine tool thus enables, on the one hand, a rapid tool change by means of the machine magazine, wherein tools can be removed from the background magazine and new tools can be introduced into the machine magazine, virtually expanding the machine magazine as it were to the size of the background magazine.

In the known machine tool, the machine magazine is configured as a chain magazine which is arranged on the y-slide of the machine tool so as to ride therewith, which machine tool is configured as a travelling-column machine. For a tool change, this chain magazine is displaced into the working space of the machine tool, whereby, for a tool interchange with the background magazine, it has to be moved into a transfer position.

Despite this machine tool meeting many requirements on account of the, in principle, unlimited number of tools and the rapid tool change, it is in the case of many applications still not suited to particularly rapid tool-change times and, in particular, to particularly rapid chip-to-chip times.

SUMMARY OF THE INVENTION

In view of the above, it is among others one object of the present invention to provide a machine tool of the type mentioned at the outset, in which, in principle, an unlimited number of tools can be rapidly exchanged into the at least one tool spindle without the processing times of the new machine tool being compromised in the case of a high throughput of tools. Furthermore, the new machine tool should be of simple design and require little space.

According to the invention, this object is achieved in the case of the machine tool mentioned at the outset in that not more than four storage places for accommodating tools are provided in the machine magazine for the or each tool spindle.

In the case of the method mentioned at the outset, this object is accordingly achieved according to the invention in that a maximum of four tools for the or each tool spindle are situated in the machine magazine at the same time.

At first sight, it does not appear to be constructive to employ a "small" machine magazine in which only three or four tools for the or each tool spindle are temporarily stored, instead of a real machine magazine that can temporarily store 20, 30 or 40 tools.

The inventor of the present invention has, however, recognized that, on account of the interaction between the machine magazine and the tool spindle, it is also possible to provide the theoretically unlimited number of tools for the tool spindle from the background magazine and nevertheless maintain the rapid tool change, even in the case of three or four tool storage places in the machine magazine.

The inventor of the present invention has furthermore specifically recognized that the machine magazine has sufficient time to perform a tool interchange with the background magazine during the main time, i.e. the time during which the tool spindle having the currently chucked tool travels from the tool-change position to the workpiece, processes said workpiece and is then returned to the tool-change position.

Specifically, it is merely necessary for each operation to transfer an already used tool from the machine magazine to the background magazine and to insert a new tool from the background magazine into the machine magazine.

During this main time there is ample time to correspondingly displace the background magazine, such that tools can be deposited and exported.

Only a maximum of four tools for the or each tool spindle are then temporarily stored in the machine magazine, i.e. the last tool, the tool being currently employed and the tool to be employed next, the next but one or the next to last tool likewise being able to be stored.

On account of this, a tool interchange is possible at the machine magazine during the main time, which is longer in comparison to the secondary time. Only the tool change on the tool spindle is carried out during the secondary time.

The tool change on the tool spindle or spindles and the tool interchange with the background magazine may take place simultaneously, the interchange between the machine magazine and the background magazine having to be terminated at the latest when the or each tool spindle has deposited the or each tool which has been used last into the machine magazine.

According to one object, the tool change on the tool spindle or spindles and the tool change on the background magazine takes place in a synchronous manner, as the motion sequences can then be mechanically coupled, this reducing the design complexity and the control complexity.

A particular advantage of the new machine tool is the low weight of the machine magazine, as it needs to keep available only four storage places for the maximum of four tools. These four storage places may be configured on a disc magazine or on a chain magazine.

According to another object, the new method may even be employed in existing machine tools, namely if all storage places except for four chain places are removed from the machine tool known from DE 102 25 143 A1 mentioned at the outset, with the result that the weight of the known machine magazine is obviously reduced.

Various timing advantages result in the case of an considerably reduced weight of the machine magazine. On the one hand, the machine magazine itself can be moved, i.e. advanced, much more rapidly; given the lower weight, the acceleration and deceleration times are much shorter than in the case of machine magazines which have to move along 20 or 40 tools at corresponding tool storage places.

On the other hand, however, the tool spindle itself can be more rapidly displaced, since the mass of the machine magazine which is entrained via the slide at least in the x-direction is obviously lower than in the prior art, such that an improved acceleration and thus shorter displacement times can also be achieved here.

Finally, approach and departure of the machine magazine to and from the tool-change position can also be implemented in a more rapid manner.

This leads to both the main time and also the secondary time being reduced, leading to a higher throughput in the case of the new machine tool.

According to a further object, the new machine tool is very simple to control. No special attention is required any longer with respect to the sequence of the tools in the machine magazine, since only ever two, three or four tools per tool spindle are present in the machine tool at any time.

Also, the sequence of the tools in the background magazine is of only minor relevance for the speed of the entire machining process, since during the main time the background magazine has sufficient time for providing the tool which has in each case to be changed next into the machine magazine.

It goes without saying that it is possible in this case to deposit the tools in the background magazine such that their spatial arrangement also corresponds to the temporal sequence in which they are to be used in the respective process.

This method is, in principle, known from the prior art. Accordingly, for example DE 43 11 469 A1 discloses a method for a tool change in which an empty position is created beside the tool to be changed, the tool to be interchanged being deposited in said empty position. The empty position is created in that a tool is temporarily stored in a special gripper.

DE 10 2006 028 A describes a refinement of this tool-change strategy, in which the tools, when placed back into the machine magazine, are deposited substantially in that sequence in which they are employed in the temporal order of processing.

This way of sorting tools may also be used in the new machine tool and the new method, but it is now no longer required that a separate gripper be employed for the temporary storage of tools which have been removed from storage in order to provide empty positions.

It is indeed possible in principle, to provide so many empty positions in the background magazine that a corresponding sorting of the tools in the temporal order during the first pass in the processing of a new workpiece takes place, for all intents and purposes, automatically.

According to the invention, the machine magazine thus has either three storage places or four storage places for each tool spindle.

It is of advantage in both cases that moving or advancing of the machine magazines is limited to a minimum, since each tool is deposited back into the storage place from which it was previously removed by the tool spindle.

Yet another advantage in terms of speed results in particular when only three storage places are provided for each tool spindle, since only three instead of four entrained storage spaces for each tool spindle are now required, again reducing the moving mass of the machine magazine.

According to a further object, the machine magazine has for each tool spindle two pairs of two storage places, which storage places are each spaced apart from one another at a first distance, wherein two adjacent storage places belonging to different pairs of storage places are spaced apart from one another at a second distance which is larger than the first distance.

It is advantageous in the case of this measure that two storage places which are adjacent to one another in one pair are employed to release the tool to be interchanged from the tool spindle into the first storage place and to pick up the current tool which is to be newly employed from the spatially close second storage place.

Here, the tool magazine needs to be displaced only over a very short path, such that the entire tool change takes place very rapidly and the secondary time for interchanging of tools on the tool spindle which, for all intents and purposes, elapses in an unproductive manner can yet again be reduced.

In other words, during the tool change on the tool spindle, the machine magazine is displaced across the first distance and, for the tool interchange between the machine magazine and the background magazine, is displaced across the longer second distance.

According to an object of the method, during the period of time in which the tool spindle carrying a current tool approaches a workpiece from the tool-change position, processes therewith said workpiece, and thereafter returns to the tool-change position, an used tool which has previously been deposited in the machine magazine by the tool spindle is removed at the tool-interchange position and preferably a new tool is deposited into a vacant storage place in the machine magazine.

On the other hand, it is an object that, during the period of time in which the tool spindle carrying a current tool approaches a workpiece from the tool-change position and processes said workpiece and thereafter returns to the tool-change position, a new tool is provided by the background magazine at the tool-interchange position.

In the event that the tool change between the tool spindle and the machine magazine and also between the machine magazine and the background magazine takes place simultaneously, the background magazine provides a new tool at the tool-interchange position with the machine magazine during the main time.

In this case, the used tool is either the tool which has been deposited last or the tool which has been deposited next to last, the new tool being the tool which is to be used next or the tool which is to be used next but one.

These measures offer the already mentioned advantage that a new tool can be provided in or for the machine magazine during the main time, such that a very rapid tool change is possible on the tool spindle during the secondary time.

Owing to the low weight of the machine magazine, the main time can also be reduced once again, since the tool spindle can be displaced very rapidly.

On the other hand, owing to the small number of tools in the machine magazine, the secondary time is also reduced, since the tool change can be planned to be optimally rapid.

In general, it is an object that the machine tool has a slide which is displaceable in a first spatial direction and on which a column which is displaceable in a second spatial direction is mounted, and on which column a spindle head which is displaceable in a third spatial direction is mounted, the tool spindle being rotatably mounted in said spindle head, and that the machine magazine is mounted on the slide, wherein the machine magazine is preferably mounted in such a manner that it is displaceable between a tool-change position, in which tools are exchanged between the machine magazine and the tool spindle, and a tool-interchange position, in which tools are exchanged between the background magazine and the machine magazine.

In the case of these measures which are, in principle, already known from DE 102 25 143 A1 mentioned at the outset, it is advantageous that they describe what is referred to as a travelling-column machine having a vertical tool spindle, which in itself already makes for very short tool-change times and very short secondary times and optimally short main times.

It should also be mentioned that only a very small space requirement for the machine magazine exists in the new machine tool, whereas essentially any amount of space is available for the background magazine, which can be constructed on the machine frame or separately from the machine frame. The background magazine may be designed as a rack magazine, for example, any other type of background magazine also being employable according to the invention.

Further advantages emerge from the description and the appended drawings.

It goes without saying that the features mentioned above and yet to be explained in the following can be utilized not only in the combination which is stated in each case, but also in other combinations or on their own, without departing from the scope of the present invention.

BRIEF DESCRIPTION OF THE DRAWINGS

Embodiments of the invention are illustrated in the drawing and are explained in more detail in the following description. In the drawing.

DESCRIPTION OF PREFERRED EMBODIMENTS

Figure 1:
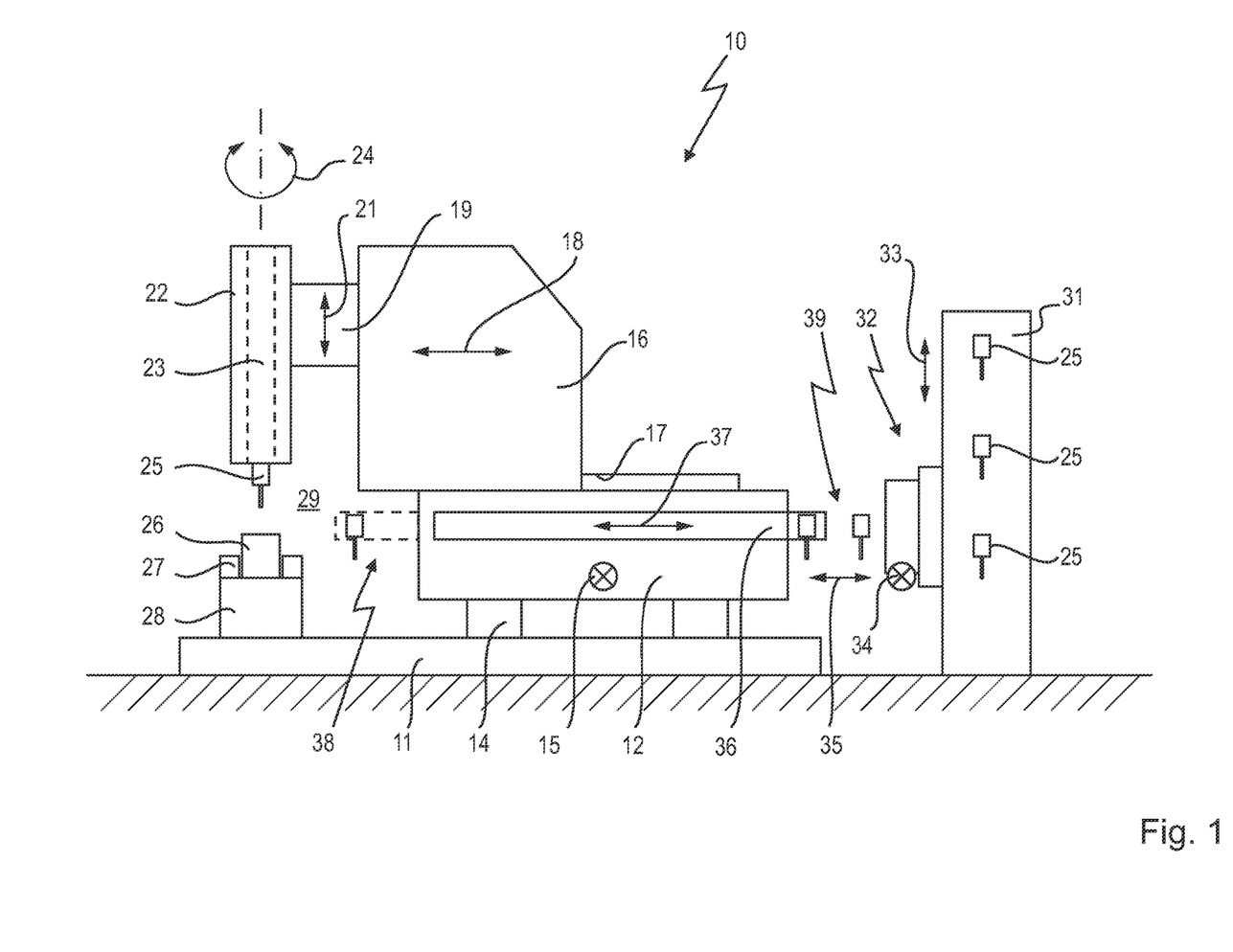
FIG. 1 shows a schematic side view of the new machine tool.

In FIG. 1, a machine tool, identified by 10, is shown very schematically in a side view. The machine tool 10 is a travelling-column machine, in which a slide 12 which is displaceable on guides 14 in the x-direction 15 is arranged on a machine frame 11.

A travelling column 16 is displaced on the x-slide 12 on guides 17 which extend in the y-direction 18.

A slide 19 which is displaceable in the z-direction 21, i.e. is adjustable for height, is arranged on the travelling column 16.

The slide 21 carries a spindle head 22 in which at least one tool spindle 23 is mounted so as to be rotatable about a rotation axis 24 in a manner known per se. The spindle head may alternatively carry two or four tool spindles with which two or four workpieces can then be processed in a simultaneous and contour-identical manner.

On its lower end, the tool spindle 23 has a typical tool holder for chucking a tool 25 with which a workpiece 26 is processed, which workpiece is retained in a device 27 which is arranged on a workpiece table 28 in the working space 29.

In this manner, the machine tool 10, with the aid of a tool 25, can process the workpiece 26 in the three orthogonal spatial axes 15, 18, 21.

A background magazine 31 in which numerous tools 25 can be temporarily stored is mounted separately from the machine frame 11 behind the machine tool 10.

It goes without saying that it is also possible for the background magazine 31 to be fixedly connected to the machine frame 11.

It should be noted, merely for the sake of good order, that the invention is also implementable with a machine tool in which the or each tool spindle 23 is not oriented in the vertical axis but in the horizontal axis, wherein furthermore not all three axes of movement 15, 18, 21 have to be implemented in the tool 25; at least one axis of movement can also be implemented in the workpiece 26, as is known, in principle, from the prior art.

A transfer device 32 which is schematically illustrated and which is displaced on the background magazine along three displacement axes 33, 34, 35 which extend in an orthogonal manner in relation to one another is arranged on the background magazine 31, said transfer device 32 depositing tools into or removing them from the background magazine 31.

The background magazine 31 is a rack magazine in the illustration shown.

A machine magazine 36 which is arranged in an entrained manner on the x-slide 12 interacts with the background magazine 31. This machine magazine 36 is, on the one hand, displaceable in the direction indicated by a double arrow 37 such that, with its front end, it protrudes into the working space 29 and provides a tool-change position 38 for the tool spindle 23 there. The tool-change position 38 is illustrated with dashed lines in FIG. 1.

In the position of the machine magazine 36 which is illustrated with solid lines, the machine magazine 36 is situated with its rear end in a tool-interchange position 39 in which, with the aid of the transfer device 32, tools 25 can be interchanged between the machine magazine 36 and the background magazine 31.

In the case of the machine magazine 36 in FIG. 1, the arrangement has been chosen such that the machine magazine 36 can temporarily store three or, at most, four tools 25, i.e. has only three or four storage places.

Figure 2:
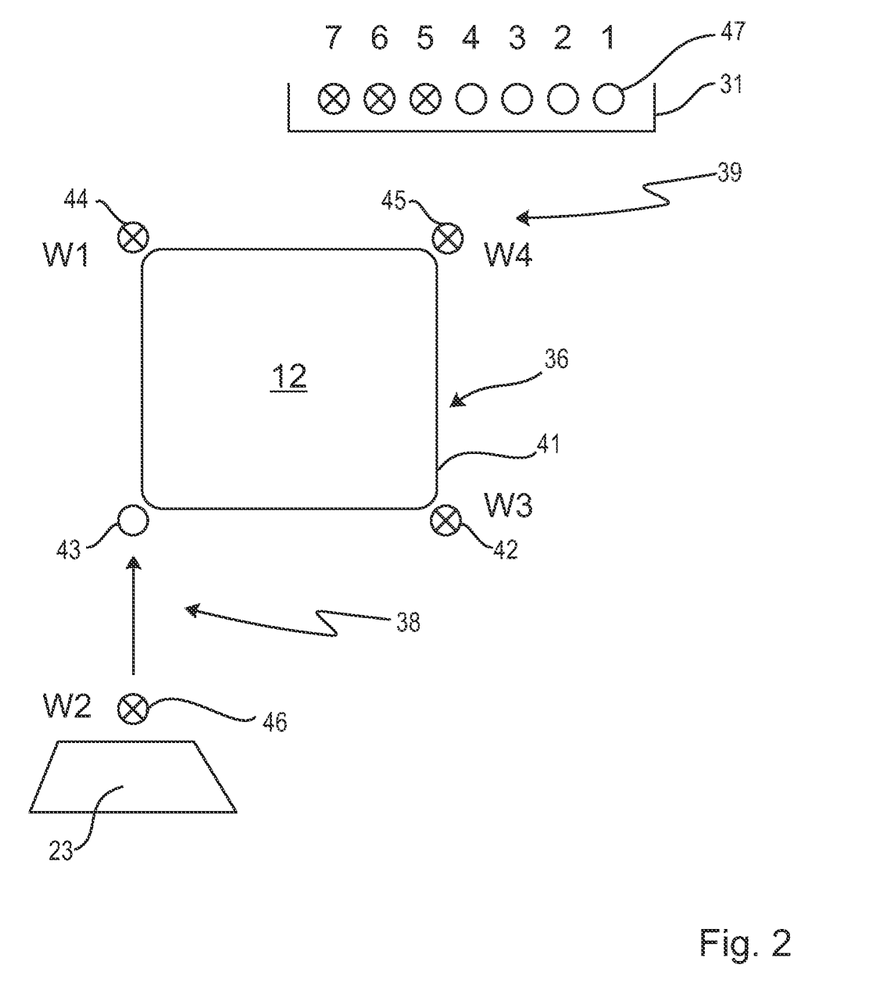
FIG. 2 shows, in a schematic plan view, the interaction of the tool spindle, the machine magazine and the background magazine for a first embodiment of the machine magazine.
Figure 3:
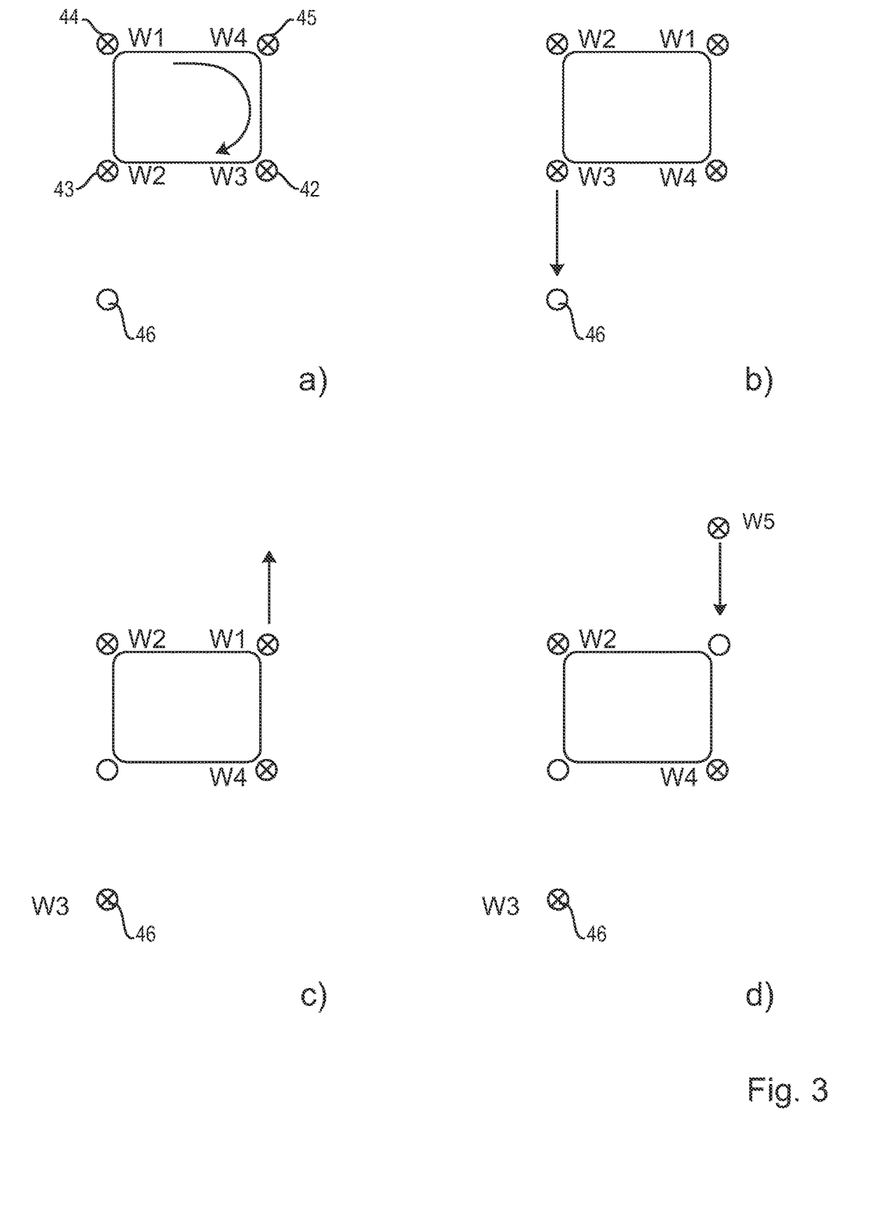
FIGS. 3a-3d show the method steps for the tool change and the tool interchange in the machine magazine of FIG. 2.

In FIG. 2, the interaction of the machine magazine 36 with the tool spindle 23, on the one hand, and the background magazine 31, on the other hand, is shown in a plan view and in a very schematic manner.

The machine magazine 36 is a chain magazine having a revolving chain 41, on which four storage places 42, 43, 44 and 45 are provided.

The tool spindle 23 has, in a known manner, a tool holder 46 into which and from which tools 25 can be exchanged at the tool-change position 38.

In the background magazine 31, which is likewise illustrated in a schematic manner, seven storage places 47 for tools are provided, the storage places 1 to 4 being currently empty, the tools W5, W6 and W7 being in the storage places 5 to 7. The tools W1, W3 and W4 are situated in the storage places 44, 42 and 45 of the machine magazine 36, whereas the tool W2 is chucked in the tool holder 46 and has been used for processing a workpiece 26 and is now to be interchanged.

It goes without saying that the storage places 47 do not necessarily have to be arranged in the background magazine 31 in the same chronological sequence in which the tools 25 are successively used; the chronological illustration in FIG. 2 has been chosen simply for the purpose of clarity.

FIGS. 3a to 3d now show how the tool W2 is exchanged with tool W3 and the tool W1 is simultaneously guided back into the background magazine 31 and the tool W5 is deposited into the machine magazine 36 in its place.

It can be seen in FIG. 3a that initially the tool W2 from the tool holder 46 has been deposited into the storage place 43.

Thereafter, the machine magazine 31 is advanced. The storage places 42, 43, 44, 45 are indexed in the clockwise direction by one position, such that the situation in FIG. 3b results.

Next, the tool W3 is now transferred into the tool holder 46, such that the situation of FIG. 3c results. Thereafter, the tool W1 is removed from the storage place 45 and transferred into the background magazine 31; see FIG. 3c.

Finally, the new tool W5 from the rack magazine 31 is deposited into the storage place 44; see FIG. 3d.

As a result, a similar situation is encountered in FIG. 3d as in FIG. 2, only now the tool W3 is the tool currently being employed, whereas the tool W2 is the next to be deposited in the background magazine 31 from which the tool W6 is then removed.

The tool W4 is the next to be used, whereas the tool W5 is the next but one to be used.

In the method for a tool change described so far, it is particularly advantageous that the machine magazine 31 is required to perform only a few indexing movements, since each tool is deposited again by the tool spindle 23 precisely from where it was removed.

Furthermore, the already mentioned advantages result in that only a very small number of storage places 42, 43, 33 and 45 have to be kept available, such that both indexing of the machine magazine 36 and the movement of the y-slide 12 take place very rapidly.

The method steps which have led from FIG. 2 via FIG. 3a and FIG. 3b to FIG. 3c are what are referred to as secondary time, during which processing of the workpiece is not possible.

During removing of the tool W1 and inserting of the tool W5, as is shown in FIGS. 3c and 3d, the tool spindle 23 can, however, process a workpiece with the tool W3; this is what is referred to as the main time.

The steps in FIGS. 3b and 3c and the steps in FIGS. 2 and 3d may also take place simultaneously, in particular the tool changes on the tool-change position 38 and on the tool-interchange position 39 are mechanically synchronized.

Figure 4:
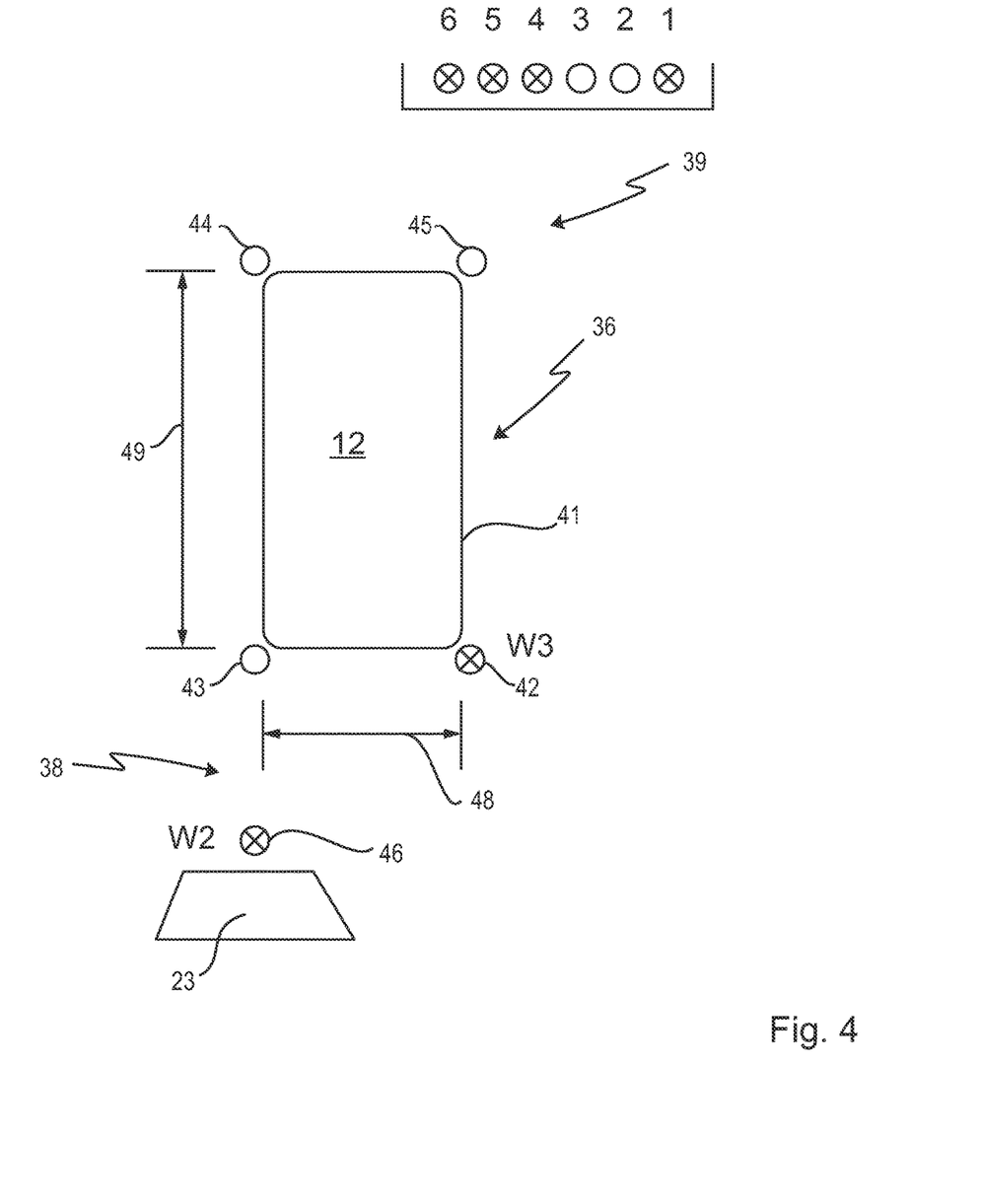
FIG. 4 shows a second embodiment of a machine magazine, in an illustration like FIG. 2.

A machine magazine 36 which likewise has four storage places 42, 43, 44 and 45 is shown in FIG. 4. Whereas adjacent storage places 42, 43, 44, 45 are equally spaced apart from one another in the chain 41 of the tool magazine 36 from FIG. 2, in the case of the tool magazine 36 from FIG. 4, two pairs of storage places 42, 43 and 44, 45 are provided, in which pairs the storage places 42 and 43 or 44 and 45 are at a smaller distance 48 from one another, while tools which are situated in different pairs and adjacent to one another in the chain 41, i.e. 43 and 44 and also 45 and 42 are at a larger distance 49 from one another.

This asymmetrical arrangement of the machine magazine 36 can be implemented in particular in the case of a chain magazine, i.e. when two storage places 42; 43 or 44; 45, respectively, which are in each case adjacent to one another in the chain 41, lie very closely next to one another but are at a very much greater distance 49 from the pair 44; 45 or 42; 43, respectively, which lies diametrically opposite in the chain 41.

The distance 48 then spans, for example, the minimum distance which has to be between two storage places in a chain 41, whereas the distance 49 spans the distance from the working space 29 to the background magazine 31.

If, for example, the storage place 42 is now to be displaced into the position of the storage place 43, only a very short displacement path and thus an extremely rapid displacement is required, whereas very much more travel time is required in the case where the storage place 43 has to be displaced into the position of the storage place 44.

Against this background, bridging of the distance 48 is utilized during the secondary time to implement extremely short tool-change times, while bridging of the distance 49 takes place during the main time, during which, therefore, the tool spindle 23 processes a workpiece using the chucked tool W2.

Figure 5:
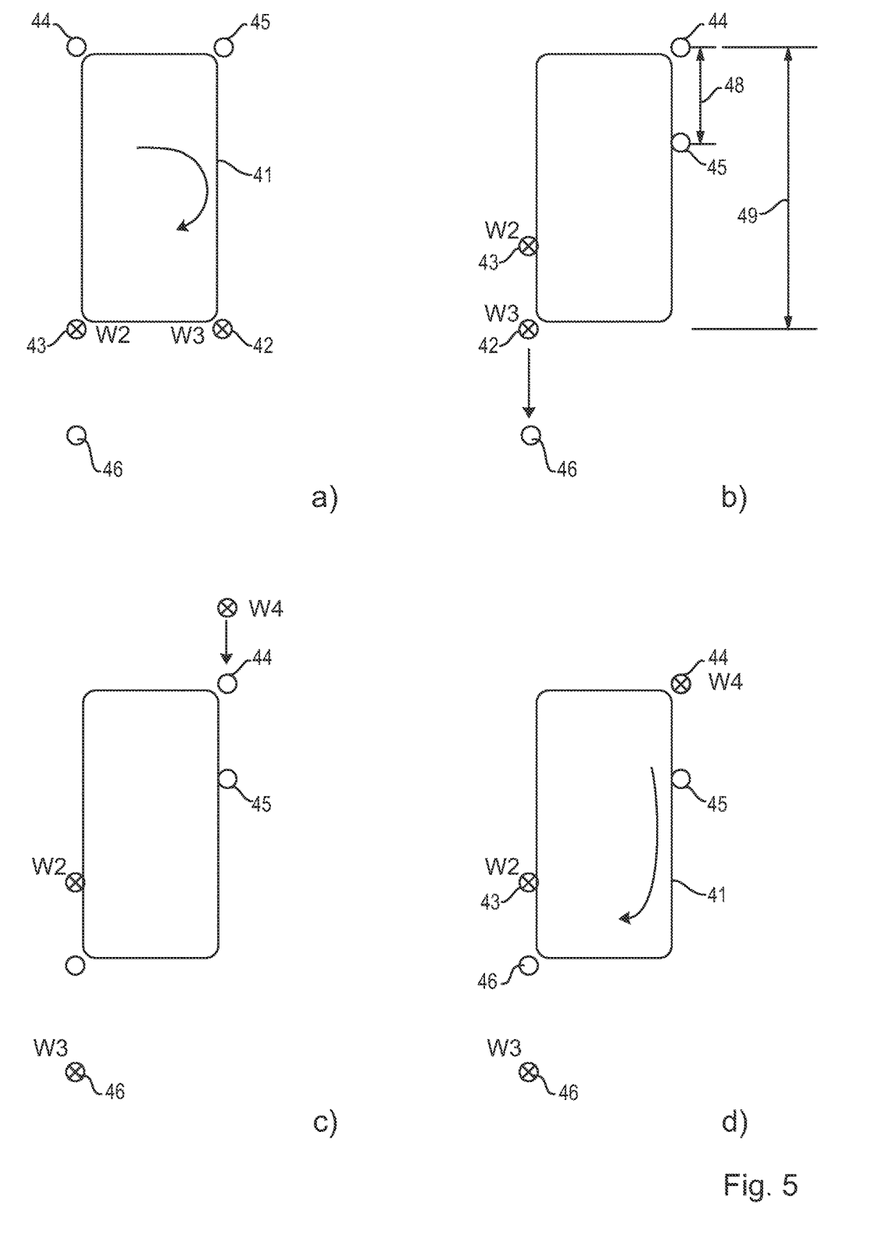
FIGS. 5a-5e show the individual steps in the tool change and the tool interchange for the machine magazine of FIG. 4.

In FIG. 4, a comparable starting position to FIG. 2 is shown, such that first the tool W2 from the tool holder 46 is deposited into the storage place 43, as can be seen in FIG. 5a. However, only one next tool W3 is temporarily stored in the chain 41.

Thereafter, the machine magazine 36 indexes the chain 41 onward by the distance 48, such that the situation in FIG. 5b results, in which the empty storage place 44 is now situated in the tool-interchange position 39, as is shown by comparison with FIG. 4.

The tool W3 to be used as the next tool has simultaneously been moved into the tool-change position 38, such that it can now be exchanged into the tool holder 46, as can be seen in FIG. 5c.

As soon as the state according to FIG. 5c has been achieved, the tool spindle 23 can process the workpiece using the tool W3 while the tool W4 is now deposited into the storage place 44 in parallel with the main time, as can be seen in FIG. 5d.

Figure 5E:
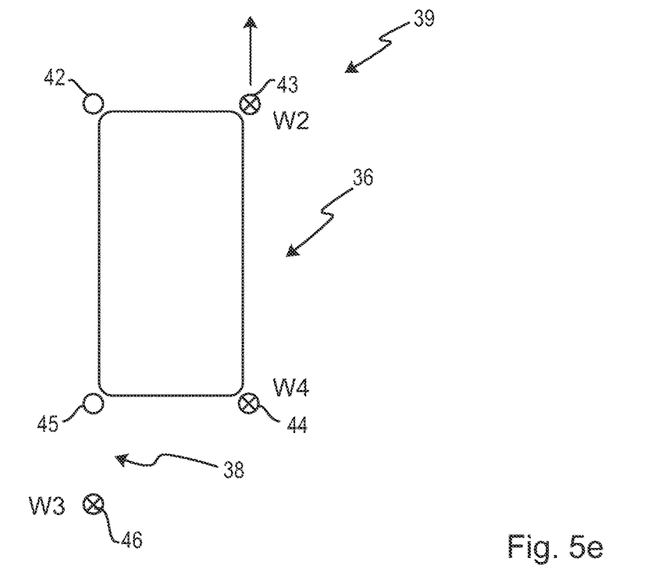

Thereafter, the tool magazine is moved again until the four corner points of the rectangle are again occupied with storage places. This situation is shown in FIG. 5e, where the empty storage place 45 is in the tool-change position 38, such that said storage place 45 can, as the next storage place, remove the tool W3 from the tool holder 46.

The tool W4, which is to be employed as the next tool, is situated directly adjacent thereto, i.e. at the short distance 48. The storage place 43 having the tool W2, which is now being removed from the machine magazine 36, is situated in the tool-interchange position 39.

In contrast to the machine magazine 36 of FIG. 2, not four but at most two tools are simultaneously situated in the chain 41 in the case of the machine magazine 36 of FIG. 4, which likewise contributes towards a reduction in weight and thus to a potential for more rapid displacement.

Nevertheless, the tool magazine 36 of FIG. 4 requires a total of four storage places 42, 43, 44 and 45; however, a maximum of two adjacent storage places 42, 43, 44, 45 are occupied by a tool 25.

Here, the secondary time lies in the steps according to FIG. 5a and FIG. 5b. On account of the short displacement path across the path 48, the secondary time is extremely short here.

Figure 6:
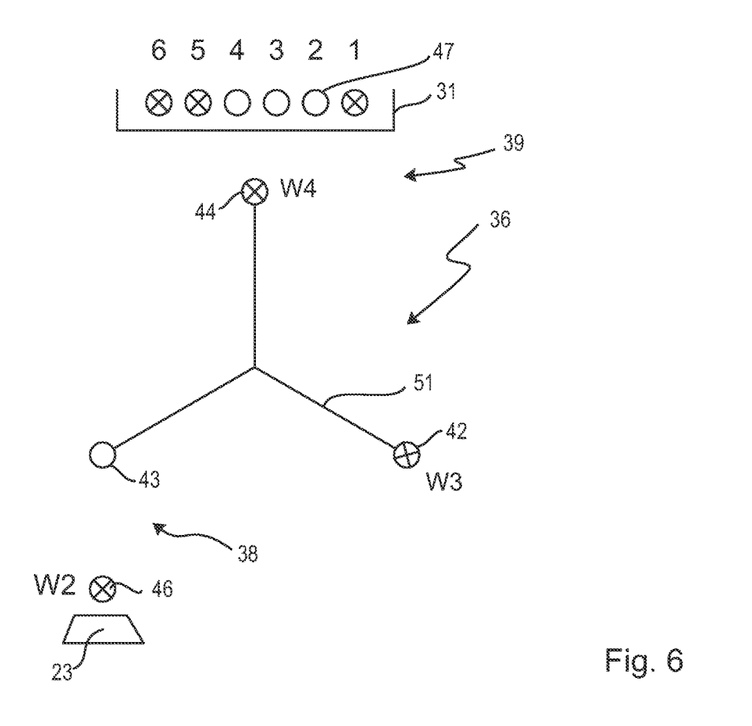
FIG. 6 shows a third embodiment of a machine magazine, in an illustration like in FIG. 2.

A further tool magazine 36 which has only three storage places 42, 43, and 44 is shown in FIG. 6 in an illustration like in FIG. 2 and FIG. 4. The machine magazine 36 is equipped, for example, with a disc 51 but may just as well be implemented in the form of a chain.

Like FIGS. 2 and 4, FIG. 6 shows the relationship between the machine magazine 36 and the tool spindle 43 at the tool-change position 38 and the background magazine 31 at the tool-interchange position 39.

Figure 7:
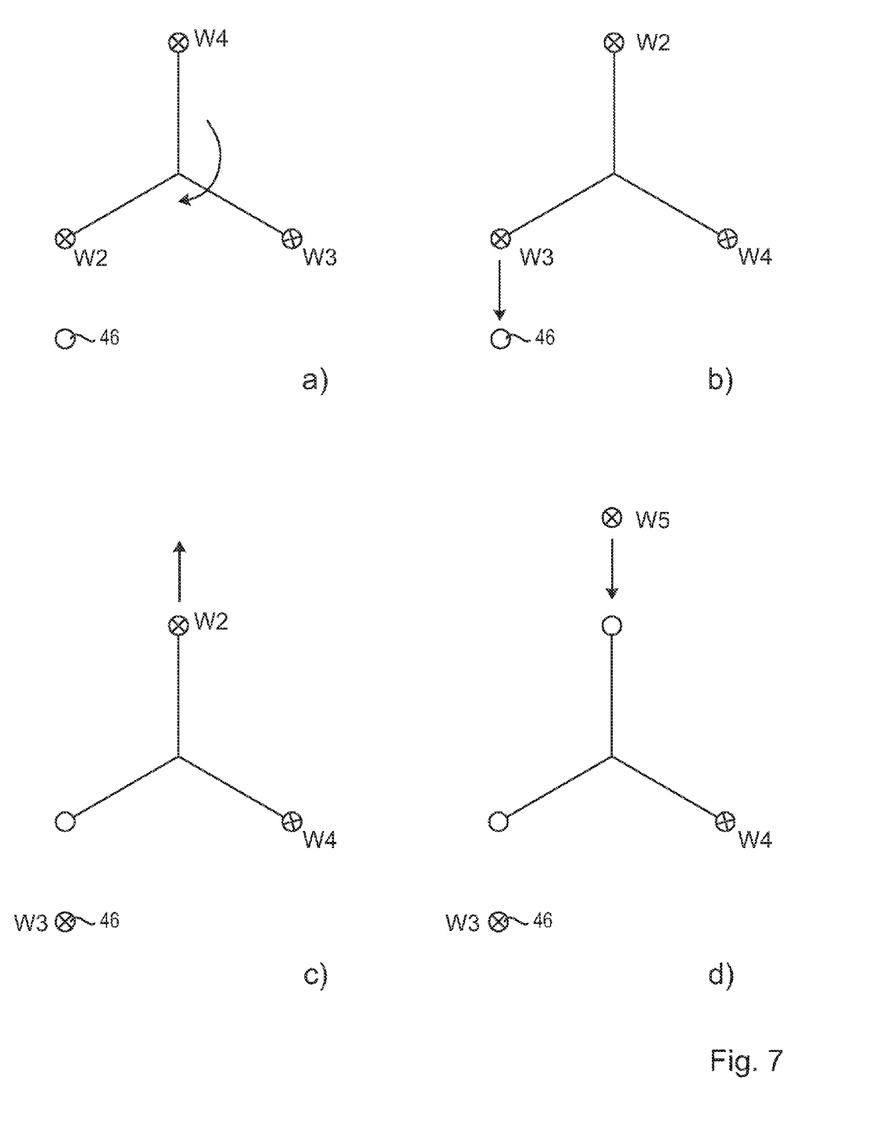
FIGS. 7a-7d show the individual steps for the tool change and the tool interchange in the machine magazine of FIG. 6.

In FIG. 7, tool changing in four steps, which progresses in a similar manner as in the case of the tool magazine of FIG. 2, is shown, except that now a maximum of always only three tools are present in the tool magazine.

First, the tool W2 is inserted into the empty storage place 43, such that the situation of FIG. 7a results. Thereafter, the machine magazine 36 is rotated forward by one step, such that the situation of FIG. 7b results, in which the new tool W3 is now in the tool-change position 38, whereas the used tool W2 is situated in the tool-interchange position 39. The tool W4 is the next but one tool to be used.

The tool W3 is now chucked in the tool holder 46, such that the situation of FIG. 7c results, whereupon the tool W2 is interchanged with the tool W5, as can be seen in FIG. 7d. Thereafter, the situation of FIG. 6 results, except that now the storage place 42 lies as an empty storage place in the tool-change position 38, whereas the storage place 43 lies in the tool-interchange position 39 and has already accommodated the new tool W5.

Finally, it should be noted that FIGS. 2 to 7 do not show whether or not the machine magazine 36 has to be displaced in the direction of the arrow 37 of FIG. 1 between the tool change at the tool-change position 38 and the tool interchange at the tool-interchange position 39.

In the event that the machine magazine 36 does not have to be displaced, a tool change at the tool-change position 38 and a tool interchange at the tool-interchange position 39 can at least in part take place simultaneously, and this can further reduce the secondary time.

Figure 8:
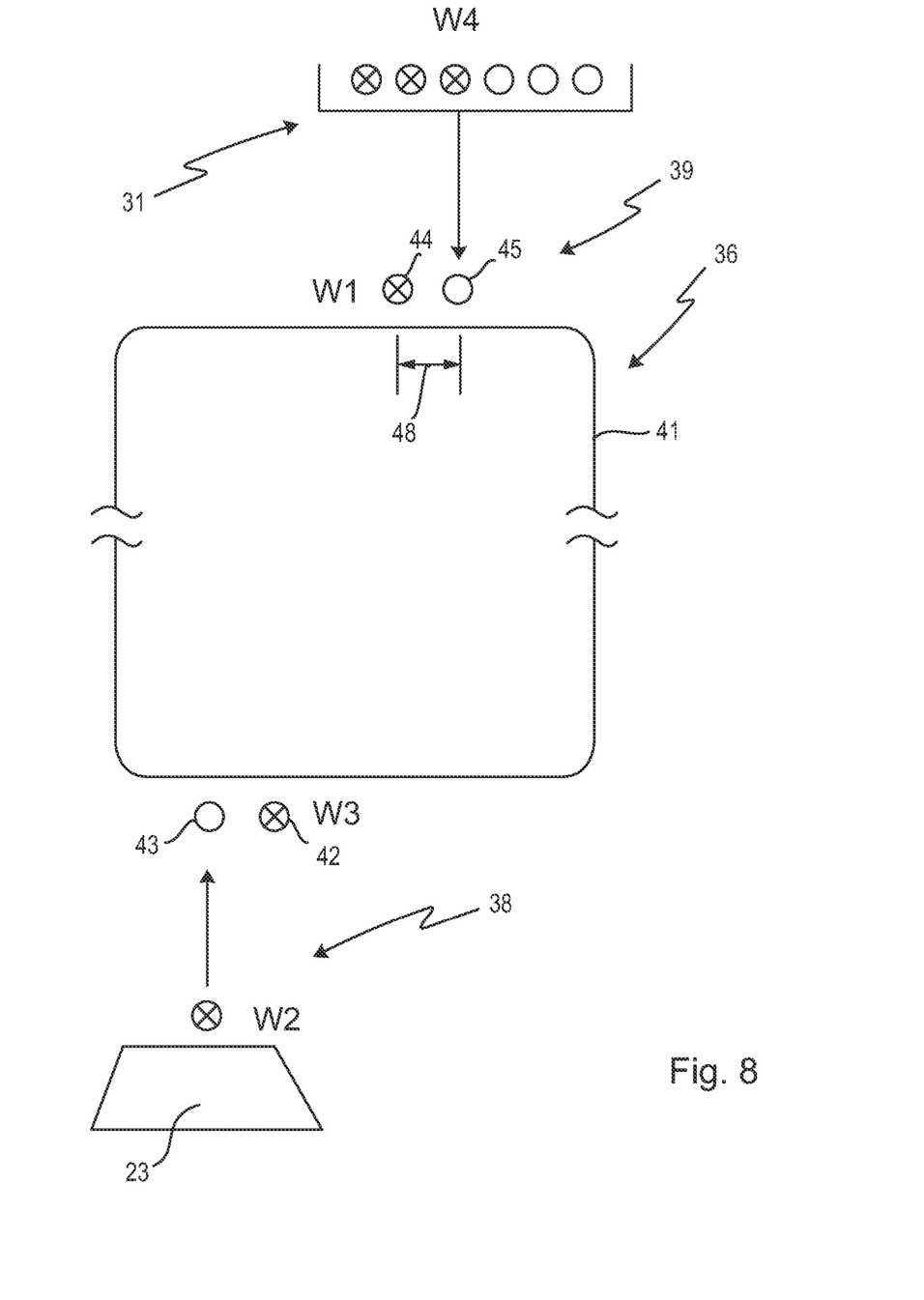
FIG. 8 shows a fourth embodiment of a machine magazine, in an illustration like FIG. 4.

The machine magazine 36 from FIG. 4 may also be arranged such that the storage places 42, 43 and 44, 45, which are arranged spaced apart from one another at the small distance 48, do not lie in the deflection corners of the chain 41 but in between, i.e. as shown in FIG. 8.

In the starting position of FIG. 8, the tool spindle 23 having the last used tool W2 is situated in the tool-change position 38 and the machine magazine 36 having the already previously exchanged tool W1 is in the tool-interchange position 39.

In a first step, the tools W2 and W4 are now simultaneously deposited into the storage places 43 and 45 of the machine magazine 36. Thereafter, the machine magazine 36 is displaced by the distance 48, such that the storage places 42 and 44 are now situated in the tool-change position 38 or the tool-interchange position 39, respectively.

Then, simultaneously, the tool W3 is transferred into the tool spindle 23 and the tool W1 into the storage place, which was previously occupied by the tool W4 and is now empty, in the background magazine 31.

The main time now starts, during which the tool spindle 23 processes a workpiece using the tool W3. The background magazine 31 simultaneously displaces the tool W5 into the tool-interchange position 39.

When the tool spindle 23 now approaches the tool-change position 38 again, the machine tool is situated in the displacement situation according to FIG. 8 again.

Figure 9:
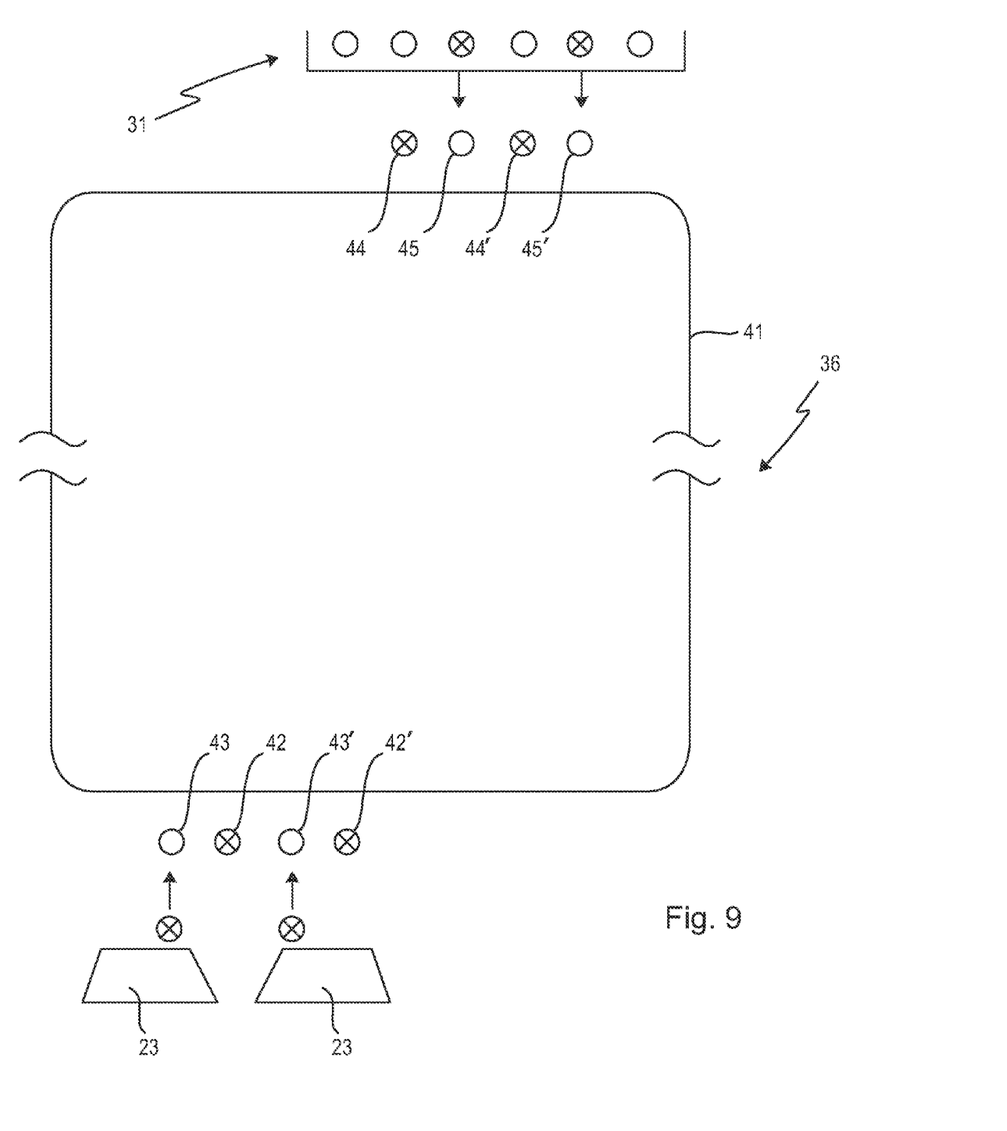
FIG. 9 shows an embodiment for a machine tool having two tool spindles and 2 times 4 storage places, in a depiction as in FIG. 4.

In the event that the machine tool is equipped with two tool spindles 23, 23', consequently 2 times 4 storage places are provided in the machine magazine 36, as shown in FIG. 9.

Apart from the fact that always two tools are changed both on the tool spindles 23, 23' and on the background magazine 31, the tool-change methods which can be carried out with multiple-spindle machines do not differ from the method described above.

The storage places 43, 42, 43' and 42' and the storage places 44, 45, 44' and 45' each form a group and are spaced apart from one another in the respective group at the same distance, which distance corresponds to half the distance between the tool spindles 23, 23'.

Therefore, what is claimed is:

1. A machine tool comprising:
   a tool spindle,
   a device for holding a workpiece,
   a machine magazine, and
   a background magazine, wherein
   said tool spindle is displaceable in at least one of three spatial directions in relation to said device for holding said workpiece,
   said tool spindle is adapted for exchangeably chucking tools for processing said workpiece,
   in said machine magazine some of said tools are provided for exchange into said tool spindle,
   in said background magazine others of said tools are provided for exchange into the machine magazine,
   only four storage places are provided in the machine magazine, each of said four storage places for accommodating one of said tools,
   said four storage places comprising a first, a second, a third, and a fourth storage place arranged in said machine magazine in a closed track, and
   said first and second storage places arranged in said closed track at a first distance with respect to one another and forming a first pair of storage places adjacent to one another along said closed track, said third and fourth storage places arranged in said closed track at said first distance with respect to one another and forming a second pair of storage places adjacent to one another along said closed track, said second and third storage places arranged in said closed track adjacent to one another along said closed track and at a second distance with respect to one another, said fourth and said first storage places arranged in said closed track adjacent to one another along said closed track and at said second distance with respect to one another, said second distance being larger than said first distance.

2. The machine according to claim 1, wherein the machine magazine is configured as a chain magazine having a chain on which said four storage places are arranged.

3. The machine tool according to claim 1, wherein said machine tool comprises a slide which is displaceable in a first spatial direction and on which a column which is displaceable in a second spatial direction is mounted, and on which column a spindle head which is displaceable in a third spatial direction is mounted, said tool spindle being rotatably mounted in said spindle head, the machine magazine being mounted on the slide.

4. The machine tool according to claim 3, wherein the machine magazine is mounted at said slide in such a manner that it is displaceable between a tool-change position, in which said tools are exchanged between the machine magazine and the tool spindle, and a tool-interchange position, in which said tools are exchanged between the background magazine and the machine magazine.

* * * * *